United States Patent [19]

Choi et al.

[11] Patent Number: 5,087,521
[45] Date of Patent: Feb. 11, 1992

[54] MODIFIED POLYMER CONTAINING ARTICLES

[75] Inventors: Jae H. Choi, Indianapolis, Ind.; John J. Mottine, West Keansburg, N.J.; Walter J. Sparzak, Sr., Catonsville, Md.; Walter D. Tates, Baltimore, Md.; William C. Vesperman, Belair, Md.

[73] Assignee: AT&T Bell Laboratories, Murray Hill, N.J.

[21] Appl. No.: 914,558

[22] Filed: Oct. 2, 1986

Related U.S. Application Data

[63] Continuation of Ser. No. 639,107, Aug. 9, 1984, abandoned, which is a continuation of Ser. No. 451,787, Dec. 21, 1982, abandoned.

[51] Int. Cl.$^5$ ............................ B32B 9/00; H01B 7/00
[52] U.S. Cl. .................. 428/389; 174/110 V;120 SR; 428/375; 428/379; 428/383
[58] Field of Search .............. 428/375, 379, 383; 174/110 V, 120 SR

[56] References Cited

U.S. PATENT DOCUMENTS 3,953,650 4/1976 Sauer et al. .............. 174/110 V
4,346,145 8/1982 Choi et al. .............. 428/375 X Primary Examiner—Lorraine T. Kendell
Attorney, Agent, or Firm—Bruce S. Schneider

[57] ABSTRACT

It has been found that the properties of poly(vinyl chloride) based polymers are substantially enhanced through the use of a specific plasticizer system. In particular, the use of specific triarylphosphates in combination with specific diarylphosphates in specific proportions not only plasticizes the PVC polymer but produces a transparent, flame retardant heat resistant, easily worked polymer. These materials are used so that the diarylphosphate is 30–45% of the total concentration of the phosphates and such that 45 to 70 parts of the phosphates are present per 100 parts of the polymer.

7 Claims, 1 Drawing Sheet

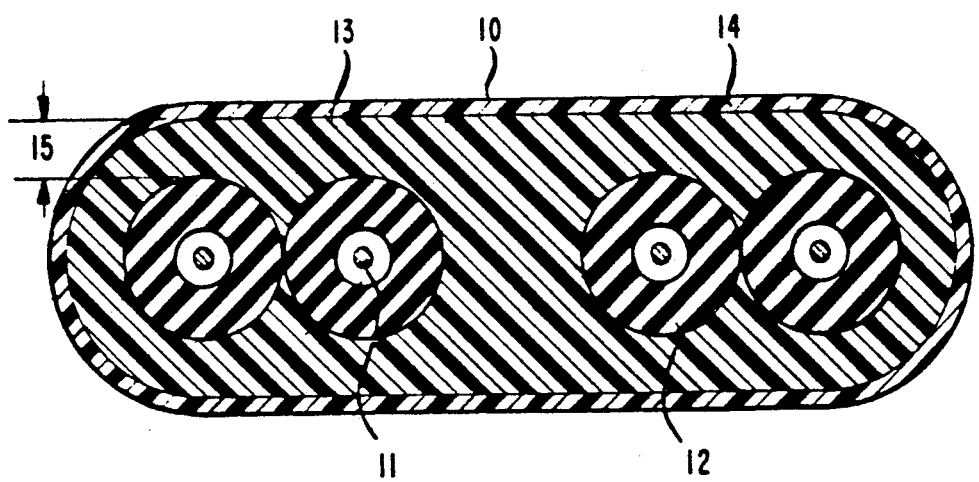

MODIFIED POLYMER CONTAINING ARTICLES

This application is a continuation of application Ser. No. 06/639,107 filed Aug. 9, 1984, and now abandoned, which is a continuation of Ser. No. 06/451,787 filed Dec. 21, 1982, and now abandoned.

BACKGROUND OF THE INVENTION

1. Field of the Invention

This invention relates to polymers and, in particular, to the modification of the properties of organic polymers.

2. Art Background

Although the use of polymers in commercial products is widespread, polymers such a poly(vinyl chloride) (PVC) are rarely used without additives blended with the polymers to modify their properties. For example, it is generally necessary to include a plasticizer with the polymer to allow the polymer to be easily molded, extruded, or otherwise formed into a desired shape. It is also required for many applications that the polymer be flame retardant. Indeed, for some demanding applications, such as the use of PVC for telephone cord coatings, it is necessary that the polymer satisfy very strict flame retardancy standards, e.g., Underwriters Laboratory (UL) 62, Vertical-Wire (VW) 1, which, for example, ensures that the polymer is self-extinguishing before propagation of a flame initiates. Additionally for many applications, such as those involving consumer products, it is desirable that the polymer composition be clear, i.e., have a yellowness index as described in ASTM 1925 no greater than 12 at room temperature and no greater than 15 after 2 hours in a forced air oven at 150 degrees C.

Obviously, the numerous applications for which polymers are employed place correspondingly demanding strictures on polymer properties. However, the simultaneous satisfaction of these demands, e.g., flame retardancy, clarity, and desirable mechanical characteristics, is often extremely difficult to achieve. For example, a typical plasticizer for PVC involves the use of a phthalate. The use of these plasticizers, however, causes the product to exude and discolor. Similarly, a typical flame-retardant additive, antimony trioxide, substantially degrades the clarity of PVC. One system involving phosphate plasticizers, described in U.S. Pat. No. 4,346,145 issued Aug. 24, 1982, (which is hereby incorporated by reference) produces a degree of flame retardancy and desirable mechanical properties but causes some degradation in clarity which is not entirely desirable for some extremely demanding applications.

The additional requirement of long-term stability imposed by many applications even further increases the difficulty of formulating a suitable additive system. Long-term stability is necessary, for example, when the polymer during processing or in subsequent use is subjected to elevated temperatures. Again, additives, i.e., heat stabilizers, such as a diglycidyl ether of bisphenol-A, enhance the heat stability of PVC at the expense of humidity aging characteristics. To exacerbate the demands on an additive system, certain properties are generally adversely affected and rarely improved by the use of additives. Such affected properties include flexibility (as defined by ASTM D-746) and the compatibility of the polymer with other polymers.

Polymers such as PVC must be blended with many additives, such as a flame-retardant, a plasticizer, and a heat stabilizer. Generally, each additional additive substantially augments the price of the blended polymer. One additive often enhances one property but either degrades a second property, e.g., clarity, or degrades the efficacy of other additives. Additives also have the disadvantageous tendency to separate from the polymer and coat-processing equipment. It is, therefore, extremely difficult to produce a suitable additive system or to improve on a desirable additive system.

SUMMARY OF THE INVENTION

An additive composition has been found for PVC-based polymers, i.e., polymers having a substantial portion of material formed from a vinyl chloride monomer, which not only is an appropriate plasticizer but also an advantageous flame retardant. This single, multifunctional additive does not adversely affect the clarity, flexibility, stability, or compatibility properties of the polymer. The additive includes both a diarylphosphate, such as 2-ethylhexyldiphenyl phosphate, and a triarylphosphate, such as isopropylphenyldiphenyl phosphate.

The heat stability properties of PVC are also significantly enhanced through the use of a cycloaliphatic epoxy resin together with a metallic stabilizer without being affected by the inventive plasticizer composition. The properties of a PVC-based polymer containing the plasticizer additive alone or together with the stability additive are significantly enhanced. The plasticizer additive also does not adversely interact with other additives, such as ultraviolet inhibitors commonly used in polymers. Thus, a PVC-based polymer containing the inventive plasticizer system is suitable even for the very most demanding applications.

BRIEF DESCRIPTION OF THE DRAWING

The FIGURE is illustrative of one embodiment of the subject invention.

DETAILED DESCRIPTION

To produce the desired degree of plasticity useful for polymer processing and the excellent flame retardancy required for demanding applications, i.e., flame retardancy which passes UL 62 VW-1, both 2-ethylhexyldiphenyl phosphate and isopropylphenyldiphenyl phosphate are employed in a specific proportion range. If both phosphates are not used in appropriate proportions, the desired properties are not achieved. The additive combination is blended with the polymer by conventional techniques, e.g., by combination in a mill such as a Banberry type intensive mixer in combination with a two-roll mill. The ratio between the plasticizer system and the polymer depends on the ultimate use to which the combined modified plastic is to be put. If the object is to be clear, then generally it is desirable to keep the weight ratio between the additive system and the polymer (without additives) to below 60 parts by weight additive per 100 parts PVC-based polymer. If more than 60 parts plasticizer system is employed, the additives of this system begin to plate-out during processing. The exudation is reduced by including additives such as fumed silica, calcium carbonate and clay. However, the additional use of such additives generally produces an opaque rather than a transparent material. If an opaque material for the particular application is acceptable, then ratios up to 70 parts plasticizer system per 100 parts PVC-based polymer are acceptable. Above a level of 70 parts plasticizer per 100 parts polymer, the material becomes too pliant and is difficult to process irrespective of measures employed to prevent plate-out. Additionally, the use of less than 45 parts additive to 100 parts PVC-based polymer generally results in an undesirable loss of flame retardancy and should be avoided.

To yield advantageous results the ratio of the compounds employed in the plasticizer system is also important. It is generally desirable to utilize in the additive composition a weight percent of 2-ethylhexyldiphenyl phosphate (EHDP),

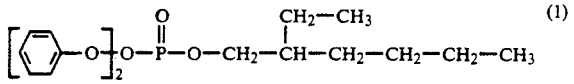

and isopropylphenyldiphenyl phosphate (IPDP),

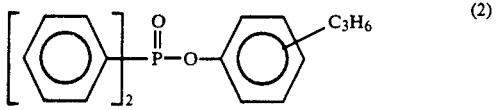

of from 55 to 70 percent by weight of EHDP and from 30 percent to 45 percent by weight of IPDP to the total weight of the two compositions (1) and (2). (For purposes of this invention ortho, para, and meta isopropylphenyldiphenyl phosphate are equivalent.) If less than 55 weight percent or more than 70 percent of 2-ethylhexyldiphenyl phosphate is employed, then the desired flame retardant properties are not achieved. Generally, the replacement of either the 2-ethylhexyldiphenyl phosphate or the isopropylphenyldiphenyl phosphate leads to degraded properties such as degraded fire retardancy. However, some slight substitution of either of the two materials composing the plasticizer system by a diarylphosphate or triarylphosphate is not precluded provided the percentage of IPDP of total phosphates is still in the range 30 to 45 and the percentage of EHDP is still in the range 55 to 70. For example, isodecyldiphenyl phosphate, when employed in up to 10 percent by weight quantities in the plasticizer system to replace an equivalent amount of 2-ethylhexyldiphenyl phosphate still allows the attainment of excellent fire retardancy and plasticity.

A second specific combination of additives (distinct from the phosphate plasticizers/flame retardants), including a cycloaliphatic epoxy and a metallic stabilizer, produces excellent heat stability for PVC polymers in combination with the inventive plasticizer. Appropriate compositions for these heat stabilizers are described in U.S. Pat. No. 4,346,145 issued Aug. 24, 1982. Briefly the heat stabilizer constitutes a cycloaliphatic epoxy resin and a metallic stabilizer. This combination is included in the polymer in a weight ratio of from 6 to 12 parts by weight of stabilizer per 100 parts of polymer. Additionally the weight percentage in the heat stabilizer of 1) the cycloaliphatic epoxy resin such as 3,4-epoxycyclohexylmethyl-3,4-epoxycyclohexanecarboxylate or a combination of cycloaliphatic epoxy resins and 2) the metallic stabilizer should be, respectively, in the range 4 to 8 and 2 to 4 parts by weight per 100 parts of polymer. Generally, it is useful to use a cycloaliphatic epoxy whose epoxy equivalent weight is in the range 131 to 143 and whose molecular weight is about 252. It should be noted that non-cycloaliphatic epoxies, such as diglycidyl ethers of bisphenol-A which are commonly employed stabilizers, do not produce advantageous results. These commonly employed stabilizers do not produce a desirable degree of stability especially when incorporated with the inventive plasticizer/flame retardant.

Metallic stabilizers including a phosphite chelator, a barium stearate, a cadmium-stearate, a barium-ethylhexoate, a barium-cadmium laurate or a barium-cadmium myristate are useful. (Phosphite chelators include, for example, a barium-cadmium-zinc phosphite or a barium-cadmium phosphite.) It is typically advantageous, but not essential, to disperse the metallic stabilizer in a carrier such as petroleum distillates before it is blended with the polymer. This dispersion is produced by a conventional expedient such as liquid blending. The metallic stabilizer together with the cycloaliphatic epoxy stabilizer is blended with the polymer by conventional techniques such as milling, e.g., using a Banberry-type intensive mixer and a two-roll mill.

As discussed, the inventive plasticizer and, if desired, the described stabilizer are employed in a PVC-based compound. In this regard a PVC-based compound is a polymer which is formed primarily from a vinyl chloride monomer, i.e., one which is at least 90 mole percent vinyl chloride constituent. The term "PVC-based polymer" includes polymers formed by techniques such 1) as free radical suspension polymerization or 2) graft copolymerization with materials such as polyolefins or ethylene-vinyl acetate copolymers or 3) through copolymerization with monomers such as propylenes or vinyl acetates.

An additional advantage of the inventive plasticizer system is that it is compatible with a wide range of other additives typically employed with PVC-based compounds. For example, a lubricant such as stearic acid in concentrations from 0.4 to 1.0 parts per 100 parts by seight of polymer is useful. Similarly, UV absorbers such as benzophenones, e.g., 4-decyl-2-hydroxybenzophenone, are useful at levels from 0.2 to 0.5 parts per 100 parts of polymer. Various dyes and tinting agents are also employable at typical concentration levels if for a particular application, the clear color achievable with the inventive additives is not desired.

Various products are producible through the use of the inventive polymer composition. For example, the inventive plasticized polymer is advantageously employed in a cable such as shown in the FIGURE. In such a cable, 10, the conductor, 11, is surrounded generally by an air space and by a flammable insulation material, 12 such as a flammable polyester-polyether copolymer, e.g., a copolymer designated Hytrel 7246 manufactured by E. I. Dupont Corporation as described in U.S. Pat. No. 4,090,763 issued May 23, 1978 (which is hereby incorporated by reference) or a propylene rubber blend such as a material designated Elexar 8481 manufactured by Shell. Generally, the inventive material, 13, is then coated around the insulated conductors and then, in turn, is sealed with a topcoating. The protective outer coating, 14, is also generally a flammable material such as a polyester, e.g., VAR 5825 polyester resin manufactured by Goodyear as described in U.S. Pat. No. 4,166,881 issued Apr. 9, 1979 (which is hereby incorporated by reference). Since both the protective coating, 14, and the conductor insulation, 12, are generally flammable, it is required that the PVC material provide the flame retardancy for the entire cable. Obviously, if the amount of PVC present is extremely small compared to the amount of insulator and protective coating, suitable flame retardancy for the entire cable is not possible. Typically, if the PVC material has a wall thickness, 15, of 18 mils or more, for typical insulator wall thicknesses in the range 6 to 8 mils, and typical protective coating thicknesses in the range 1 to 7 mils, adequate flame retardancy is achieved.

For some applications it is desirable to keep the outside diameter of a cable constant irrespective of the size of the conductors, 11, employed. Thus, as the conductor size increases, the other material forming the cable must decrease. Generally, this decrease is predominantly accomplished by decreasing the thickness of PVC employed. For typical conductor sizes, adequate flame retardancy is achieved. Nevertheless, as previously stated, the thickness level of PVC should not be excessively reduced.

The following examples are illustrative of procedures used to form the inventive polymer blends and the compositions useful in these blends.

EXAMPLE

Approximately 100 parts of a PVC polymer purchased from the B. F. Goodrich Company conforming to ASTM Standard for 1966 in a range from GP4-00005 to GP5-00005 as defined in ASTM Standard D1755-66 was combined with 0.675 parts of stearic acid, with 0.025 parts of a UV stablizer purchased from Argus Chemical denoted Mark 202A, with 0.225 parts by weight partially oxidized polyethylene purchased from Allied Chemical Company, with 0.6 parts of a fumed silica designated CAP-O-Sil MS-7 purchased from Cabot Corporation, and with 0.03 parts by weight blue tint toner sold by Claremont Corporation under designation DR-153. The liquids were blended in a separate container by combining 30 parts by weight of EHDP per 100 parts PVC with 20 parts IPDP, 6 parts ERL-4221, a cycloaliphatic epoxy sold by Union Carbide Corporation, and 3 parts of a barium-cadmium-zinc phosphite stablizer designated 6079W sold by Ferro Chemical Corporation. The solids and liquids were each individually agitated. After mixing, the liquids were added to the solids to form a material which had a paste-like consistency. The resulting paste was processed utilizing a dynamic intensive mixer manufactured by Bolling Corporation. The resulting body appeared as a fused plastic cake. The cake was then processed through a two-roll mill to produce sheets having a thickness of approximately one hundred mils.

To form an 8 inch square by 75 mil thick sheet, approximately 100 grams of the sheeted material is formed in a compression molding machine. These sheet samples were 1) tested for yellowness under ASTM specification D-1925, 2) heated for two hours at 302 degrees F. and again measured under D-1925, 3) measured for brittleness under ASTM D-746, and 4) were measured for heat stability utilizing the Brabender dynamic heat stability test. (The Brabender test involved processing the material at 100 rpm and 205 degrees C. using a number 5 roller head through a Brabender, Plasti-Cord Torque rheometer. Torque generated in the machine versus time was plotted. The time it takes for the slope of the plot to change 30 degrees was measured and considered an indication of heat stability.)

A 37 mil in diameter conductor was prepared utilizing a polyether/polyester insulation (7 mil wall) of a material designated Hytrel 7246 sold by E. I. Dupont Corporation. The preparation of the insulated conductor is described in U.S. Pat. No. 4,090,763 issued May 23, 1978, U.S. Pat. No. 4,206,011 issued June 3, 1980, and U.S. Pat. No. 4,339,298 issued July 13, 1982 (which are hereby incorporated by reference). The above-described PVC blend (25 mil wall) was formed around four conductors as shown in the FIGURE and the entire composition was topcoated with a polyester described in U.S. Pat. No. 4,166,881 issued Sept. 4, 1979 (the composition designated VAR-5825 in this patent was employed). The final topcoated jacketed product was subjected to ASTM flame retardancy test UL-62, VW-1. During fabrication, the PVC jacket was also evaluated for plate-out by optically monitoring the amount of plate-out occurring on the two-roll mill.

A large variety of compositions, sheets, and cables were produced and tested. The results for each composition for the resulting sheet and cable are shown in the following table. (Under each test heading, the minimum values for a material having the desirable properties of the invention are indicated.)

TABLE

|  | Yellowness Index (Max. 12) | Yellowness Index 2 Hours 302° F. (Max. 15) | Low Temperature Brittleness (Min. −17 C.) | Plate Out (Max. M) | Brabender Heat Stability (Min. 18 Mnts) | UL 62, VW-1 (10/10 Passes) |
|---|---|---|---|---|---|---|
| EHDP (100%) (45 pts) | 10 | 13 | −23 | M | 23 | 2/10 |
| IPDP (100%) (45 pts) | 10 | 12 | +3 | S-L | 24 | 0/10 |
| EHDP (55%) IPDP (45%) |  |  |  |  |  |  |
| (40 pts) | 12 | 16 | −14 | L | 18 | 7/10 |
| (45 pts) | 10 | 13 | −18 | L | 24 | 10/10 |
| (50 pts) | 8 | 11 | −20 | L-M | 26 | 10/10 |
| (60 pts) | 7 | 10 | −21 | M-H | 30 | 10/10 |
| (65 pts) | 7 | 10 | −22 | H | 32 | 10/10 |
| EHDP (60%) IPDP (40%) |  |  |  |  |  |  |
| (40 pts) | 12 | 17 | −17 | L | 17 | 8/10 |
| (45 pts) | 10 | 13 | −19 | L-M | 24 | 10/10 |
| (50 pts) | 8 | 11 | −21 | M | 26 | 10/10 |
| (60 pts) | 7 | 10 | −24 | M-H | 29 | 10/10 |
| (65 pts) | 7 | 10 | −26 | H | 32 | 10/10 |
| EHDP (70%) IPDP (30%) |  |  |  |  |  |  |
| (40 pts) | 12 | 18 | −17 | L-M | 16 | 8/10 |
| (45 pts) | 10 | 13 | −20 | L-M | 23 | 10/10 |
| (50 pts) | 8 | 12 | −22 | M | 25 | 10/10 |

TABLE-continued

| | Yellowness Index (Max. 12) | Yellowness Index 2 Hours 302° F. (Max. 15) | Low Temperature Brittleness (Min. −17 C.) | Plate Out (Max. M) | Brabender Heat Stability (Min. 18 Mnts) | UL 62, VW-1 (10/10 Passes) |
|---|---|---|---|---|---|---|
| (60 pts) | 7 | 10 | −24 | M-H | 28 | 10/10 |
| (65 pts) | 7 | 10 | −25 | H | 31 | 10/10 |
| IPDP (100%) (50 pts) | 8 | 11 | +1 | S-L | 27 | 0/10 |
| EHDP (100%) (50 pts) | 8 | 11 | −25 | M-H | 26 | 3/10 |
| EHDP (50%) IPDP (50%) (50 pts) | 8 | 11 | −19 | L-M | 26 | 8/10 |
| EHDP (55%) IPDP (45%) (50 pts) | 8 | 11 | −20 | M | 26 | 10/10 |
| EHDP (70%) IPDP (30%) (50 pts) | 8 | 11 | −22 | M | 25 | 10/10 |
| EHDP (75%) IPDP (25%) (50 pts) | 8 | 11 | −23 | M-H | 25 | 8/10 |
| EHDP (85%) IPDP (15%) (50 pts) | 8 | 11 | −23 | M-H | 25 | 7/10 |
| TBEP (100%) (50 pts) | 25 | >60 | −30 | H | 12 | 1/10 |
| IPDP (100%) (50 pts) | 8 | 11 | +1 | S-L | 27 | 0/10 |
| EHDP (100%) (50 pts) | 8 | 11 | −25 | M-H | 26 | 3/10 |
| IDDP (100%) (50 pts) | 8 | 11 | −23 | M | 25 | 0/10 |
| IPDP (50%) TBEP (30%) (50 pts) | 10 | 30 | −17 | L | 23 | 4/10 |
| EHDP (60%) TBDP (40%) (50 pts) | 8 | 11 | −20 | M | 25 | 10/10 |
| EHDP (50%) IPDP (50%) | 7 | 10 | −20 | M-H | 29 | 8/10 |
| | 7 | 10 | −21 | H | 32 | 9/10 |
| (60 pts) (65 pts) EHDP (75%) IPDP (25%) | | | | | | |
| (60 pts) | 7 | 10 | −26 | H | 27 | 8/10 |
| (65 pts) | 7 | 10 | −27 | H | 30 | 8/10 |
| IDDP (60%) IPDP (40%) (50 pts) | 8 | 11 | −19 | L | 26 | 2/10 |
| EHDP (55%) IDDP (20%) IPDP (25%) (50 pts) | 8 | 11 | −21 | M | 26 | 6/10 |
| EHDP (60%) IDDP (10%) IPDP (30%) (50 pts) | 8 | 11 | −22 | M | 27 | 10/10 | pts - parts
H - heavy
L - light
Mnts - minutes
S - slight
M - medium
IPDP - isoproprylphenyldiphenyl phosphate
TBDP - t-butylphenyldiphenyl phosphate
IDDP - isodecyldiphenyl phosphate
EHDP - 2-ethylhexyldiphenyl phosphate
TBEP - tributoxyethyl phosphate

What is claimed is:

1. A cable comprising an electrical conductor surrounded by an electrically insulating body wherein said electrically insulating body includes a region of a flame retardant composition, said flame retardant composition comprising a poly(vinyl chloride) based polymer region having a property modifying additive system CHARACTERIZED IN THAT said additive system includes 2-ethylhexyldiphenyl phosphate and isopropylphenyldiphenyl phosphate wherein the total concentration of said phosphates in said poly(vinyl chloride) based polymer region is in the range 45 to 70 parts per 100 parts by weight of said polymer and wherein the percentage by weight of said isopropylphenyldiphenyl phosphate of said total concentration of said phosphates is in the range 30 to 45 percent.

2. The cable of claim 1 wherein said poly(vinyl chloride) based polymer comprises poly(vinyl chloride).

3. The cable of claim 1 wherein said total concentration of said phosphates is in the range 45 to 60 parts per 100 parts by weight of said polymer.

4. The cable of claim 3 wherein said additive system includes a cycloaliphatic epoxy and a metallic stabilizer.

5. The cable of claim 1 wherein up to 10 percent of said total concentration of said phosphate is isodecyldiphenyl phosphate which replaces an equivalent amount by weight of said 55 to 70 percent of said 2-ethylhexyldiphenyl phosphate.

6. The cable of claim 1 wherein said additive system includes a cycloaliphatic epoxy and a metallic stabilizer.

7. The cable of claim 6 wherein said cycloaliphatic epoxy comprises 3,4-epoxycyclohexylmethyl-3,4-epoxycyclohexancarboxylate.

* * * * *